United States Patent [19]

La Scala et al.

[11] 4,223,840

[45] Sep. 23, 1980

[54] STATIONARY DROP OR FIN STREAM IRRIGATION SYSTEM FOR CITRUS ORCHARDS, FRUIT-TREES, VEGETABLES AND FODDER PLANTS

[76] Inventors: William La Scala; Guido Buttiglione, both of Strade Statale 18, Km.417+700 Acconia (CZ), Italy

[21] Appl. No.: 947,669

[22] Filed: Oct. 2, 1978

[51] Int. Cl.² .......................... B05B 1/14; B05B 15/06
[52] U.S. Cl. .................................... 239/207; 239/542; 239/547; 47/48.5
[58] Field of Search ............... 239/207, 450, 536, 542, 239/547, 565; 47/48.5

[56] References Cited

U.S. PATENT DOCUMENTS

| | | | |
|---|---|---|---|
| 3,035,777 | 5/1962 | Bodell et al. | 239/207 X |
| 3,672,571 | 6/1972 | Goodricke | 239/450 X |
| 3,876,146 | 4/1975 | Pacheco | 239/450 X |
| 3,882,892 | 5/1975 | Menzel | 239/542 X |
| 3,973,732 | 8/1976 | Diggs | 239/547 X |

FOREIGN PATENT DOCUMENTS 2336739  3/1974  Fed. Rep. of Germany .......... 239/542

*Primary Examiner*—Robert W. Saifer
*Attorney, Agent, or Firm*—Townsend and Townsend

[57] ABSTRACT

An irrigation system for trees, vegetables, fodder plants and the like having a feeding network including main and secondary liquid distribution pipes, vertical pipes branched off the distribution pipes and conneted to substantially horizontal distribution tubes located above ground. Each such tube extends along a row of trees, or, in absence of trees, at predetermined mutual equal distances from other tubes. Each horizontal tube mounts liquid distribution cases, each positioned near a tree or, in absence of trees, at predetermined mutual distances. Each distribution case is provided with a plurality of peripheral radial slots through which pass a variable number of small slightly flexible, downwardly depending tubes made of dark plastic. At least some of the small tubes have their outlet orifices placed at a predetermined distance above the ground.

19 Claims, 5 Drawing Figures

STATIONARY DROP OR FIN STREAM IRRIGATION SYSTEM FOR CITRUS ORCHARDS, FRUIT-TREES, VEGETABLES AND FODDER PLANTS

The present invention relates to a system comprising a pipe network, partly arranged underground and partly airsuspended and designed to feed and distribute water or liquid fertilizers. In the following description reference is made only to a water distribution system. From predetermined points of the network vertical tubes are branched off, each designed to feed at least one distribution tube, which hereinafter will be called "water tube" and which is made of rigid plastics as, for instance, polyvinyl chloride or polyethylene. Each of the water tubes is substantially horizontal and is carried by suitable supports. At predetermined positions along each of the water tubes distribution boxes are mounted hereinafter referred to as "derivation boxes or cases" which feed a plurality of hanging water distribution pipes, called "delivery pipes" of differing lengths and which can be extended with additional pipe sections and sleeve joints. The delivery pipes are mounted at convenient positions and they are uniformly spaced from each other in such a manner that the water and the like can fall onto the ground so as to maintain a correct degree of moisture for the plant roots.

In general each horizontal water tube extends along a row of trees and each derivation case is positioned near a plant so that the hanging flexible distribution pipes are sufficiently spaced from the branches of the plant so that they can depend towards the ground. For fields under herbaceous cultivations or inside glasshouses, the water tubes are positioned at a height over the ground level of from 3 to 5 m, and the derivation cases are mounted thereon at a mutual distance of about 4-5 m.

The mutual spacing of the flexible delivery pipes are obtained by the use of small ropes of plastics. On account of the fact that the water is distributed from the top, the required water pressure into the water tubes is low and can be of the order of a half atmosphere. In the cases of very calcareous waters it is necessary to use, at suitable time intervals, higher pressures to cleanse and remove deposits which may form. In the event the used liquids are contaminated it will be necessary to first decant or filter them.

Drop irrigation systems are already known in which tubes are used which are disposed above or below ground and along which drop distribution means are provided which allow the liquid to be dispensed in drops.

Such systems have the inconvenience that they interfere with the use of agricultural machines since they can obstruct their passage. In contrast thereto, the irrigation system of this invention performs a distribution of the liquid from above so that broad ground bands remain entirely free to thereby permit the use of tractors or other agricultural machines. The invention for the water distribution provides to use small hanging pipes made of black, slightly flexible plastics having an inner diameter of 1-2 mm, thus avoiding the use of pipes of smaller diameter which could be easily obstructed by deposits of the solids suspended in the liquid or by algae which can be present, even if filters are used for purification purposes. These small pipes are of a dark color for the purpose of preventing light from promoting the growth of algae in the inside of said pipes.

Said small flexible pipes which pass through the tree leaves and those which pass among the herbaceus plants from water drops of fine water streams which fall onto the ground so that said water can seep very slowly through the ground, thereby maintaining the roots moist and without wetting the leaves. Of course, simple pipes are used which assure a free water delivery, prevent the formation of any obstruction in the pipe.

These and other characteristics of the present invention will be better understood from the following specification of an embodiment of this invention, shown in the accompanying drawings, in which.

Figure 1:
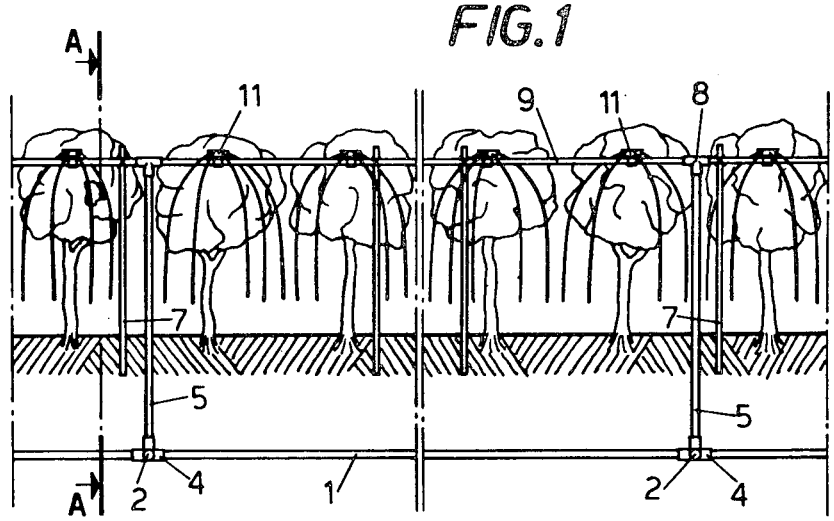
FIG. 1 is a diagrammatic partial view of several tree rows, said view being taken in a vertical plane parallel to the secondary feeding tubes from which vertical distribution tubes are branched off.
Figure 2:
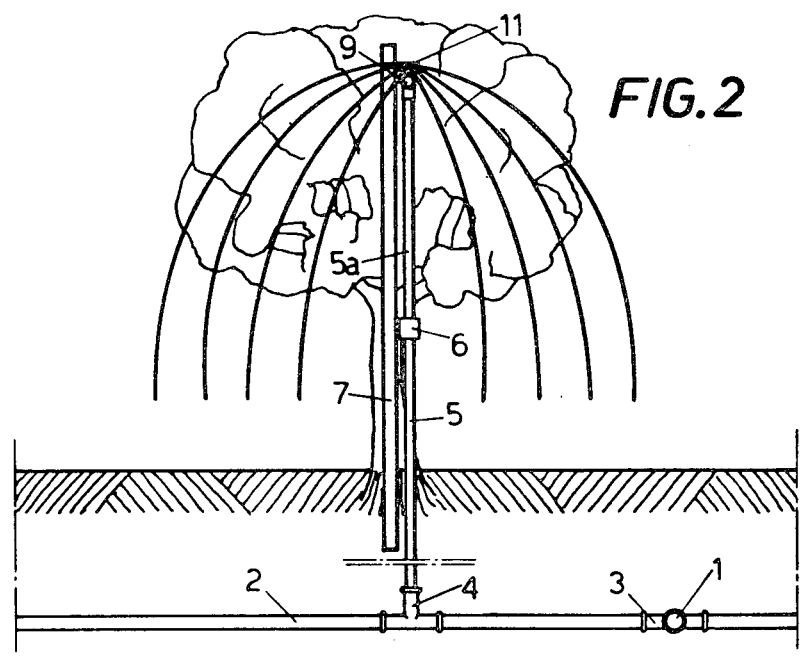
FIG. 2 is an enlarged detail, in section, and is taken along the line A—A of FIG. 1 at a right angle to a distribution pipe and shows a tree adjacent to a water feeding tube, a distribution case and other pertinent parts of the irrigation system.
Figure 3:
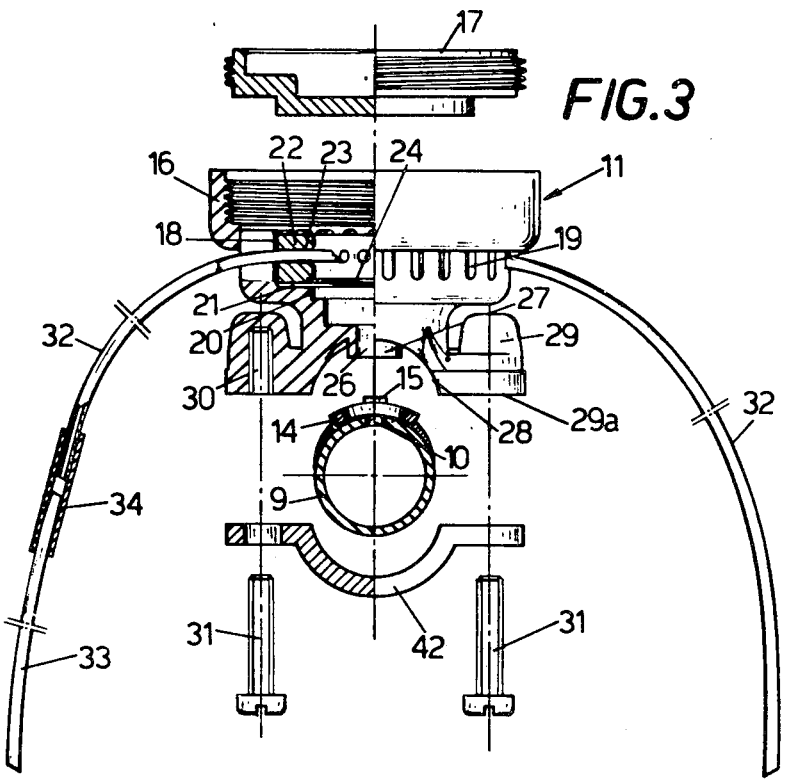
FIG. 3 shows a front view of the right half and a section of the left half of a distribution box or case constructed, according to a first variant of the system for the connection of said box with a distribution pipe made of rigid plastics.
Figure 4:
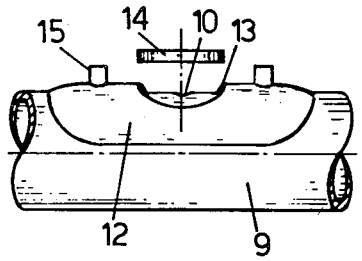
Figure 5:
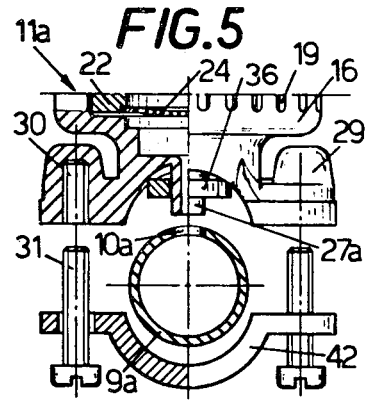

FIG. 4 is a longitudinal side view of a detail of the portion of the rigid pipe, shown in FIG. 3 where the connection means are provided and which includes positioning means and a hole through which the liquid flows out; and FIG. 5 is a view, partially in section, of the lower portion of a distribution box constructed according to a variant designed to be used for the connection of a flexible distribution pipe, made of polyethylene, for instance.

DESCRIPTION OF THE PREFERRED EMBODIMENTS

Now referring to the drawings, there are main feeding tubes 1 and secondary feeding tubes 2, set at right angles and placed underground, said main and secondary tubes 1 and 2 already being often present in several agricultural fields for conveying the water to conventional sprinklers. Of course, nothing prevents that in new system said main tubes 1 and secondary tubes 2 can be constructed underground or according to an air-disposition. The secondary tubes 2 in general are set at right angles to the tree rows. Each tube 2 is branched off from a main tube 1 by means of a pipe connector 3, and by means of T-connectors 4 two or more vertical tubes 5 are connected to a tube 2, said vertical tubes being made of plastics as for instance, polyvinyl chloride. Each tube 5 can be of a diameter of one inch and of a height above ground of about 100-130 cm, said tubes 5 have threaded end portions. In the event that no centralized filtering apparatus is provided, a filtering box 6 is removably mounted to each vertical tube 5. The filtering box prevents the passage of algae or solid impurities, which might be transported in the liquid to be distributed which can be water or also a liquid containing fertilizers.

A second tube section 5a is connected, to the upper portion of the box 6. Section 5a has a diameter about half the diameter of the tube 5 and a height of about 100-350 cm. On the upper end of tube section 5a is a T-connector 8 for the connection of a water distribution tube 9 extending along the tree row.

For a good operation of the system on each plot of land, it is advisable that all connector pipes 8 be placed at the same elevation from the ground at a distance of about 2.5 to 5 m therefrom so as to allow the tractor to be freely driven between two adjacent tree rows.

Adjacent each tube 5,5a and optionally also at intermediate points strong stakes or posts 7 are placed. These posts may be made of wood, reinforced concrete or the like and they carry the horizontal water distribution tube 9 and the distribution boxes or cases 11.

Each stake 7 has a height greater than that of the respective tube 9 and is provided with suitable struts. The tubes 9 are made of plastics, as, for instance, rigid polyvinyl chloride or polyethylene of a slightly flexible type and they must be adapted to withstand to a pressue of at least 6 atmospheres.

They have an outer diameter of about 20 mm and a thickness not less than about 1.4 mm. The tubes 9 are fastened by suitable means to the vertical stakes 7 which could be also all or only in part substituted by taut steel cables mounted at a height of about 3 to 5 m above the ground level so as to obtain a pergola-like carrying structure. The end portions of the tubes 9 are inserted in the pipe connectors 8 and they should also be supported at intermediate points so that their span between two adjacent pipe connectors 8 forms a catenary which is slightly concave near its center so as to promote the flow of the water towards said central zone. One or more of distribution boxes 11 or derivation cases are mounted in vicinity of each tree, or they are spaced from each other a distance of about 4–6 meters for vegetables or fodder plants having short stems.

The derivation cases 11 are preferably mounted on top of tubes 9 at an elevation of 2 to 5 m above the ground along a row of plants and at a distance substantially equal to that of the plant rows or, in absence of the latter they are spaced from each other a distance of about 5 to 7 m.

According to the variant shown in FIGS. 3 and 4, the tube 9 is of a rigid type and in register with the vertical axis of each distribution case 11. Tube 9 is provided with a small hole 10 of a diameter of about 2.5 mm at each location where a box 11 is to be mounted. A saddle-like element 12 made of polyvinyl chloride or the like and having a large central orifice 13 in register with the axis of the hole 10 is bonded to tube 9. Element 12 houses a packing ring 14 made of rubber. Two small pins 15 extend upwardly from element 12. They are provided for a correct positioning of the derivation case 11 on the tube 9 in register with the hole 10. The cases 11 are substantially identical in both of the embodiments shown in FIGS. 3, 4 and 5; only the connection system varies slightly depending on whether a rigid pipe 9 (FIGS. 3 and 4) or a semirigid pipe 9a (FIG. 5) is used.

The derivation box or case 11 is preferably made of nylon and comprises a hollow body 16 provided with an inner threaded portion near its upper open end, formed to receive a plug having an externally threaded portion and adapted to seal the box-like body 16.

Two superposed, cylindrical, coaxial chambers 18 and 20 formed in body 16 beneath the thread which engages plug 17. The upper chamber 18 has a greater diameter and a peripheral wall provided with a plurality of radial slots 19 while the lower chamber 20 has a lesser diameter so as to define an inner annular shoulder 21. A rubber ring 22 is placed on shoulder 21. A plurality of radial holes 23 of a number which is less or equal to the member of the slots 19 extend through the ring and the ring has a radial extent substantially equal to that of the shoulder 21 on which said ring 22 is mounted so that the chamber 20 can be put in communication with the outside only through the holes 23 and through slots 19 which are in register with the holes 19 of the ring 22. Of course, the holes 23 of the ring 22 are angularly spaced from each other a distance equal to or a multiple of the spacing of the slots 19. Provision should be made to have available a series of rings 22, each ring having different number of holes 23 so as to be able to obtain a distribution box 11 with the desired number of water distribution pipes 32.

A filtering disc 24 made of nylon is removably mounted beneath ring, said chamber 20 extending downwardly with an axial duct 26 projecting outwards with a short pipe length 27 designed to enter the orifice of the packing ring 14. Underneath and about the pipe 27 the lower part of the box 16 forms a saddle like recess 28 designed to sealingly receive the upper portion of the tube 9 placed underneath the saddle like element 12. At both sides of the saddle recess 28 the lower portion of the body 16 forms two brackets 29 having lower flat surfaces 29a through which threaded holes 30 extend. The holes are arranged to receive locking screws 31 for tightly bolting a semicollar 42 against the brackets 29 in order to put in communication the hole 10 with the overlying distribution case 11.

Through the slots 19 and the holes 23 of the ring 22 will be inserted water distribution pipes 32 which are made of dark polyvinyl chloride or polyethylene; additional lengths of extension pipes 33 can be connected to pipes 32 with small sleeves of plastics 34.

The embodiment shown in FIG. 5 is substantially identical to the preceding one, except that the pipe 9a is made of slightly flexible polyethylene. In the tube 9a there is a hole 10a having an outer diameter of 5.5 mm, slightly less than the outer diameter of a union 27a which can be forced into the hole 10a. A packing washer 36 of rubber is provided to assure a water tight connection. All the other parts are identical and are indicated with the same reference numerals as are used in the embodiment of FIGS. 3 and 4.

This variant is more adapted to be used in glasshouses or where there is a supporting framework so that slightly flexible water distribution tubes 9a can be used which are less rigid than the tubes 9.

The small pipes 32, 33 are arranged to pass through the leaves of the trees between the bifurcations of the branches of the trees which serve to support and to guide said small pipes 32, 33 in whatever direction is derived. The pipes have open ends facing the ground at a distance above the ground of about 40 cm. Since said pipes 32 and 33 are of a flexible type, they cannot hinder the movement of tractors, machines, ladder transfer or the means for fruit or vegetable picking. In the case of fodder or vegetable cultivation in an open field, several or all the pipes 32 can be extended downwardly through connection sleeves 34 by additional lengths of pipes 33; at least some of them can be sufficiently long so that their open ends are inserted into the ground. By uniformly spacing the pipes 33 from each other, for example by means of a rope network arranged parallel to the ground a uniform distribution of water can be attained and water drops can reach the root system of each plant thereby to provide an appropriate irrigation and fertilization thereof. In cases in which the water to be distributed contains fertilizers which must directly reach the root systems such an arrangement assures that the water and fertilizer are appropriately fed to the roots.

What is claimed is:

1. A controlled water feed irrigation system for plants growing in a field comprising: at least one main liquid distribution pipe connected to a source of a pressurized liquid; a plurality of secondary distribution pipes oriented substantially transversely to rows formed by the plants and in fluid communication with the main liquid distribution pipe; a plurality of vertically oriented conduits extending from the pipes and terminating in upper ends spaced above the ground; means fluidly connecting each vertical conduit with a pipe; a substantially horizontally disposed liquid distribution tube spaced above the ground; means fluidly interconnecting the tube with upper ends of the conduits; a plurality of spaced apart liquid distribution cases mounted to the tube, the tube including a like plurality of holes, and each case including means communicating an inside of the case with an interior of the tube through a corresponding hole, the case further including a plurality of spaced apart slots communicating the inside of the case with the exterior thereof; and a slightly flexible, relatively small diameter tube member extending from the interior of the case through the slots and having a sufficient length to depend from the case in a generally downward direction to a point proximate the ground; whereby the pressurized liquid from the source can flow through the pipes, the conduit and the tube into the interior of the case and hence through the tube members extending through the slots and depending downwardly from the cases to the ground for a metered, low flow dispensing of the liquid to the plants in the field.

2. A system according to claim 1 wherein at least the vertical conduits, the horizontal tubes, and the suspended small diameter tubes are made of a plastic material.

3. A system according to claim 1 including support means for spacing and supporting the horizontal tubes above ground.

4. A system according to claim 3, wherein support means includes upright supporting posts anchored to the ground and supporting the distribution tubes at spaced apart intervals.

5. A system according to claim 1, wherein each distribution case comprises a hollow body provided with a liquid tight plug, said body defining the inside of the case, the inside including a first cylindrical axial chamber having a peripheral wall provided with radial slots uniformly angularly spaced from each other, a second cylindrical, coaxial chamber disposed beneath the first chamber and having a lesser diameter than the diameter of the first chamber, an axial duct extending downwardly from the second chamber and a concentric outer pipe fluidly communicating with the duct, a semicylindrical saddle-like recess formed in the case to receive an upwardly facing portion of a horizontal distribution tube, a bracket at each side of said recess and provided with threaded holes for the fastening of said tube to said case by means of threaded bolts and a semicollar attached to said tube so that the depending pipe is in registry with the hole in the tube and concentrically received therein, a rubber ring placed in the chamber and provided with a number of radially oriented apertures which is no greater than the number of slots, the apertures being positioned at an angular distance so as to align them with the slots, the apertures having a diameter substantially equal to that of the tubular members.

6. A system according to claim 5, wherein each liquid distribution case includes a filtering disc made of nylon and mounted beneath the rubber ring.

7. A system according to claim 5, wherein the tubular members have a diameter slightly greater than that of the radial apertures in the rubber ring housed in each distribution case, and an inner diameter of between about 1-2 mm, wherein the tubular members are made of an opaque plastic material, and further including small diameter extension tubes, and connection sleeves constructed of a plastic material and fluidly interconnecting the tubular members with the extension tubes.

8. A system according to claim 1 wherein the main and secondary pipes are disposed underground.

9. A system according to claim 1 wherein the main and secondary pipes are disposed above ground and spaced therefrom.

10. A system according to claim 1 wherein the connecting means connect the conduits to a secondary pipe.

11. A system according to claim 1 including a plurality of generally parallel, spaced apart secondary pipes, and wherein the tubes extend generally transversely to the secondary pipes.

12. A system according to claim 11 wherein the tubes are parallel to the plant rows.

13. A system according to claim 11 wherein the tubes are equally spaced from each other.

14. A system according to claim 12 wherein the plants comprise trees, and including at least one liquid distribution case for each tree and positioned proximate such tree.

15. A system according to claim 1, wherein the tube members depend downwardly from the respective liquid distribution cases and contact and thereby are at least partially supported by portions of the plants beneath the cases.

16. A system according to claim 1, wherein the tubes are from between about 3 m to about 5 m above ground.

17. A system according to claim 1 wherein the tube members are constructed of an opaque plastic material.

18. A system according to claim 1 wherein the horizontal distribution tubes are constructed of a relatively rigid plastic material; wherein each distribution case includes a downwardly depending pipe nipple in fluid communication with the inside of the case; and further including a saddle-like element for each hole in the distribution tube, the element having an orifice for receiving the nipple, the orifice being aligned with a corresponding hole in the distribution tube and having a diameter larger than the hole; and a liquidtight packing ring placed within the orifice for establishing a seal between the hole, the orifice and the pipe nipple; the element further including upwardly extending pins and the case including correspondingly located and dimensioned openings for receiving the pins and thereby aligning the case with the element so that the hole, the orifice and the nipple are in axial alignment with each other.

19. A system according to claim 1 wherein the distribution tubes are made of a plastic material and are relatively flexible, wherein the holes in the tubes have a relatively large diameter, and wherein each case includes a downwardly depending pipe nipple in fluid communication with the inside of the case, the nipple having a sufficient length so that it extends through the hole in the horizontal distribution tube into the interior thereof; and further including a packing washer placed about the nipple and disposed between the horizontal distribution tube and the case; and means biasing the case against the tube so as to interconnect them and form a liquid-tight seal between them with the washer.

* * * * *